(12) United States Patent
Kuchibhotla et al.

(10) Patent No.: US 9,514,110 B2
(45) Date of Patent: Dec. 6, 2016

(54) COLLABORATIVE EDITING OF ELECTRONIC DOCUMENTS

(71) Applicant: Hewlett-Packard Development Company, L.P., Houston, TX (US)

(72) Inventors: Anjaneyulu Seetha Rama Kuchibhotla, Bangalore (IN); Dilip Mysore Devaraj, Bangalore (IN); Eniyan Thiruvidam, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 847 days.

(21) Appl. No.: 13/853,024

(22) Filed: Mar. 28, 2013

(65) Prior Publication Data

US 2014/0298198 A1 Oct. 2, 2014

(51) Int. Cl.
*G06F 17/24* (2006.01)
*G06F 17/22* (2006.01)
*G06Q 10/10* (2012.01)

(52) U.S. Cl.
CPC .......... *G06F 17/24* (2013.01); *G06F 17/2288* (2013.01); *G06Q 10/101* (2013.01); *G06Q 10/109* (2013.01)

(58) Field of Classification Search
None
See application file for complete search history.

(56) References Cited

U.S. PATENT DOCUMENTS 7,730,105 B2 6/2010 Wake
8,311,513 B1 * 11/2012 Nasserbakht ........ G06Q 10/109
455/410

(Continued)

OTHER PUBLICATIONS

An Oracle White Paper—Oracle Beehive: A Flexible Collaboration Platform for the Enterprise, Aug. 2010, pp. 1-17, Available at: <oracle.com/us/products/middleware/beehive/026988.pdf>.

(Continued)

*Primary Examiner* — Maryam Ipakchi
(74) *Attorney, Agent, or Firm* — HP Inc Patent Department

(57) ABSTRACT

Systems and methods for editing electronic documents in collaborative environment are described. In one implementation, a document collaboration system comprises a processor, and a scheduling module, coupled to the processor. The scheduling module receives request of a user for either one of collaborative editing and collaborative reviewing a section of the electronic document during a schedule time selected by the user. The scheduling module further retrieves a schedule from the user from an electronic calendar of the user. The scheduling module ascertains the electronic document availability in the selected schedule time slot. On ascertaining the availability of the electronic document during the selected time slot, the scheduling module determines availability of users in the selected schedule time slot. The scheduling module provides permission to either one of the collaborative editing and collaborative reviewing the section of the electronic document, for the selected schedule time, based on determining.

19 Claims, 5 Drawing Sheets

(56) References Cited

U.S. PATENT DOCUMENTS

| | | | |
|---|---|---|---|
| 2002/0076015 A1 | 6/2002 | Norwitz et al. | |
| 2004/0107256 A1* | 6/2004 | Odenwald | G06Q 10/107 709/205 |
| 2006/0026502 A1* | 2/2006 | Dutta | G06Q 10/10 715/230 |
| 2006/0069599 A1* | 3/2006 | Hatoun | G06Q 10/0633 705/7.27 |
| 2006/0168530 A1 | 7/2006 | Muller et al. | |
| 2006/0282784 A1* | 12/2006 | Taylor | G06Q 10/10 715/751 |
| 2007/0143398 A1* | 6/2007 | Graham | G06Q 40/02 709/204 |
| 2007/0192155 A1* | 8/2007 | Gauger | G06Q 10/00 705/301 |
| 2009/0019367 A1* | 1/2009 | Cavagnari | G06F 21/62 715/716 |
| 2009/0235182 A1* | 9/2009 | Kagawa | G06F 17/30873 715/753 |
| 2010/0257015 A1 | 10/2010 | Molander | |
| 2010/0332278 A1* | 12/2010 | Stern | G06Q 10/1093 705/7.18 |
| 2012/0150942 A1 | 6/2012 | Alev et al. | |
| 2012/0331036 A1* | 12/2012 | Duan | G06Q 10/0631 709/203 |

OTHER PUBLICATIONS

Avanes, Artin, Adaptive Workflow Scheduling Under Resource Allocation Constraints and Network Dynamics, PVLDB '08, Aug. 23-28, 2008, Auckland, New Zealand (7 pages).

Blythe et al., Task Scheduling Strategies for Workflow-based Applications in Grids, 2005 (9 pages).

Hirales-Carbajal et al., J Grid Computing, Multiple Workflow Scheduling Strategies with User Run Time Estimates on a Grid, Mar. 13, 2012 (24 pages).

Yu et al., QoS-based Scheduling of Workflow Applications on Service Grids, 2004 (8 pages).

* cited by examiner

COLLABORATIVE EDITING OF ELECTRONIC DOCUMENTS

BACKGROUND

In a collaborative working environment where an electronic document is created, a plurality of users, through their individual contributions, complete their respective activities to complete the electronic document. A project is usually divided into multiple tasks. Each of the plurality of users may work on different tasks of the project, such as planning, writing, reviewing, and proofreading. Successful completion of the assigned tasks in the collaborative working environment may involve a lot of administrative work including task assignment, task scheduling and application sharing amongst a plurality of users.

BRIEF DESCRIPTION OF FIGURES

The detailed description is provided with reference to the accompanying figures. In the figures, the left-most digit(s) of a reference number identifies the figure in which the reference number first appears. The same numbers are used throughout the figures to reference like features and components.

DETAILED DESCRIPTION

Figure 1A:
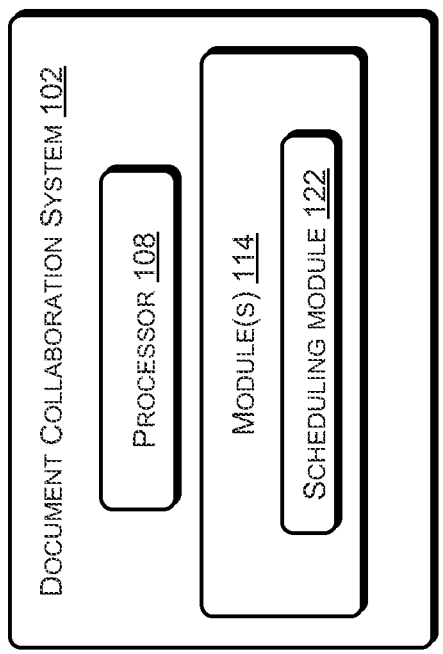
FIG. 1a schematically illustrates a document collaboration system, according to an example of the present subject matter.

The present subject matter relates to systems and methods for collaborative editing of electronic documents. The methods and the systems as described herein may be implemented as any commercially available computing systems, such as a workstation, a server, and a personal computer and mobile devices.

Completion of projects for creation of electronic documents, within the constraints of time and resources, is a challenging task. A single electronic document may require inputs from multiple users. For example, a first user may create the structure of the electronic document by providing the various sections of the electronic document. A second user may then generate content, in the form of text, for the various sections of the electronic document. A third user may add graphics to illustrate the textual content and a fourth user may review and finalize the electronic document.

In some cases a user, who is assigned a subsequent task in the workflow of creation of the electronic document, is unable to estimate when the electronic document would be available for him to work on. This makes it difficult for the users to schedule their other activities. In some situations, two users may select the same time slot for working on the electronic document thereby resulting in a conflict. In such situations, the electronic document is usually inaccessible to one of the users which may disrupt his planned schedule. In certain scenarios, the user may erroneously select the same time slot to work on two different electronic documents. In such scenarios, the user may have to defer working on one of the electronic documents, thus disrupting the schedule of other users who are to work on the electronic document subsequently. Furthermore, multiple users may have to collaborate together and work on the electronic document. For the same, the users may have to determine a common time slot during which all the users, despite having different schedules, are available for working on the electronic document.

The commercially available systems for collaboration of electronic document are based on first come first serve basis. For example, time slot opted by the user is cross checked with time slots opted by other users. In case the time slots are not overlapping, the electronic document is reserved by available collaboration systems for the user to work upon. Such systems may also use an inbuilt calendar to determine a most suitable time slot for the user to schedule the task. Selecting the appropriate time slot may require the user to manually populate the inbuilt calendars with their schedule and at the same time be aware of other prescheduled tasks while scheduling the electronic document using the collaboration systems. In other scenarios, the user keeps manual track of all the prescheduled tasks before scheduling the task, for example, from third party calendars. Such mechanisms for tracking the appropriately available time slots are inefficient and subject to manually tracking and manually selecting the available time slots.

Few other systems may however allow only one user to work on the document one at any given instance of time. In such a case, even if different users are to work, i.e., edit different sections of the same document, the document would be accessible for reviewing or editing only when one of the users has completed the edits.

The systems and the methods, described herein, implement collaborative editing of electronic documents. In one implementation, the method of collaborative editing of electronic documents is implemented using a document collaboration system.

In one example, a project creator may provide an input to the document collaboration system to define a workflow for creation of the electronic document. In another example, the project creator may select a workflow template, from amongst the pre-existing workflow templates of the document collaboration system, to define the workflow for creation of the electronic document. The workflow may define one or more collaboration states. The collaboration states may comprise the tasks associated with one or more users, for example, creating content and reviewing content of the electronic document.

The collaboration states may further comprise predetermined schedule of the user associated with the task. For example, the workflow may comprise a schedule of the user during which the user is required to perform the task of editing an electronic document. The collaboration state may indicate availability of the electronic document based on the predetermined scheduling of the electronic document among users.

In operation, the document collaboration system may assign the tasks to a user based on the collaboration state of the workflow and availability of users as reflected in a user planner. The user may then select the task he wants to perform and schedule the task by indicating a schedule time slot in which he intends to perform the task. The task may relate to reviewing or editing either the entire document or may relate to reviewing or editing one or more sections within the document under consideration. Based on the schedule time provided by the user, the document collaboration system may verify whether any other user has opted for working, i.e., reviewing or editing the entire electronic document or one or more sections thereof, within an overlapping time slot. In case the document collaboration system determines that the electronic document is not in use or the same section of the electronic document is not in use during the scheduled time slot, the document collaboration system may grant user with permissions to work on the electronic document during the schedule time slot.

On the other hand, if the document collaboration system determines that the electronic document, either in its entirety or for the same section during the opted time by user, it may collaborate by generating response to all the users for confirmation before granting permission to work on the electronic document. In one example the document collaboration system may propose a schedule time to the user for scheduling the electronic document based on assessment of free time slot available in the user planner. As the user accepts the proposed schedule time, the document collaboration system may generate a response indication the confirmation of the user to all the other users.

Additionally, the document collaboration system may grant similar permissions to a group of users to work the electronic document. For example, two users, who are collaborating, may be granted "write" permissions to the electronic document. In another example, other users may be given "read" permissions for viewing the electronic document in a "read-only" mode.

The document collaboration system may also lock, i.e., prohibit any access of the electronic document for the schedule time slot and thus, prevent access of the electronic document by any other user. In one example, the document collaboration system may also update the user planner based on the assigned task to the user.

The document collaboration system may determine a previously scheduled task on the assigned schedule time slot based on the user electronic calendar. In another example, the document collaboration system may generate a response providing a warning to the user of a conflict in scheduling the task during the schedule time slot.

In one scenario, the completion of the task may take more time than the user may have anticipated. In order to minimize the chances of conflict in such scenarios, the document collaboration system may prescribe a grace time period between two subsequent tasks to be performed on the electronic document. The grace time period is the minimum time interval which has to be maintained between the end time of a preceding task and the start time of a subsequent task. In one example, the document collaboration system may facilitate the user to extend his schedule time slot by a pre-defined time interval. In another example the grace time may be configurable. The user may also set the grace time to be nil.

Thus, the document collaboration system as described above facilitates collaborative editing and collaborative reviewing of the electronic documents. The document collaboration system collaborates among different users and provides them access of the electronic documents based on the predetermined scheduled tasks of users, electronic document availability, and user's availability based on the user planners. The document collaboration system may further streamline collaborative reviewing or editing of documents, by locking the electronic document from being accessed by other users whenever the other user is scheduled to work on it based on nature of the electronic document. The document collaboration system also collaborates among the users to achieve dedicated time to work on electronic document and prioritize among multiple tasks that may have been assigned to the user during document collaboration. The document collaboration system also notifies all users, in advance, regarding the availability of the electronic document for performing tasks and enhances the chances of efficient and effective collaboration.

The above systems and methods for collaborative editing of electronic document are further described in conjunction with FIGS. 1a and 1b and 2a and 2b. It should be noted that the description and figures merely illustrate the principles of the present subject matter. It will thus be appreciated that various arrangements that embody the principles of the present subject matter, although not explicitly described or shown herein, can be devised from the description and are included within its scope. Furthermore, all examples recited herein are only for pedagogical purposes to aid the reader in understanding the principles of the present subject matter. Moreover, all statements herein reciting principles, aspects, and embodiments of the present subject matter, as well as specific examples thereof, are intended to encompass equivalents thereof.

FIG. 1a schematically illustrates the components of document collaboration system 102, according to an example of the present subject matter. In one example, the document collaboration system 102 may be implemented as any commercially available computing system.

In one implementation the document collaboration system 102 a processor 108 and modules 114 coupled to the processor 108. The modules 114, amongst other things, include routines, programs, objects, components, and data structures, which perform particular tasks or implement particular abstract data types. The modules 114 may also be implemented as, signal processor(s), state machine(s), logic circuitries, and/or any other device or component that manipulate signals based on operational instructions. Further, the modules 114 can be implemented by hardware, by computer-readable instructions executed by a processing unit, or by a combination thereof. In one implementation, the modules 114 include a scheduling module 122.

In one example, the scheduling module 122 may receive a request from a user for collaborative editing of an electronic document in a scheduled time slot selected by the user. The scheduling module 122 may further receive the request for collaborative reviewing of the document in the selected scheduled time slot. Further, the scheduling module 122 may retrieve a schedule of the user. For example, the scheduling module 122 may retrieve schedule of the user from electronic calendars. The scheduling module 122 may then ascertain whether one or more sections of the electronic document is unavailable to perform collaborative editing or reviewing of the electronic document.

Based on ascertaining of the availability of the electronic document, availability of the user during the selected scheduled time is determined. The scheduling module 122 may allow access to the user for either one of the collaborative editing and collaborative reviewing the section of the electronic document.

Figure 1B:
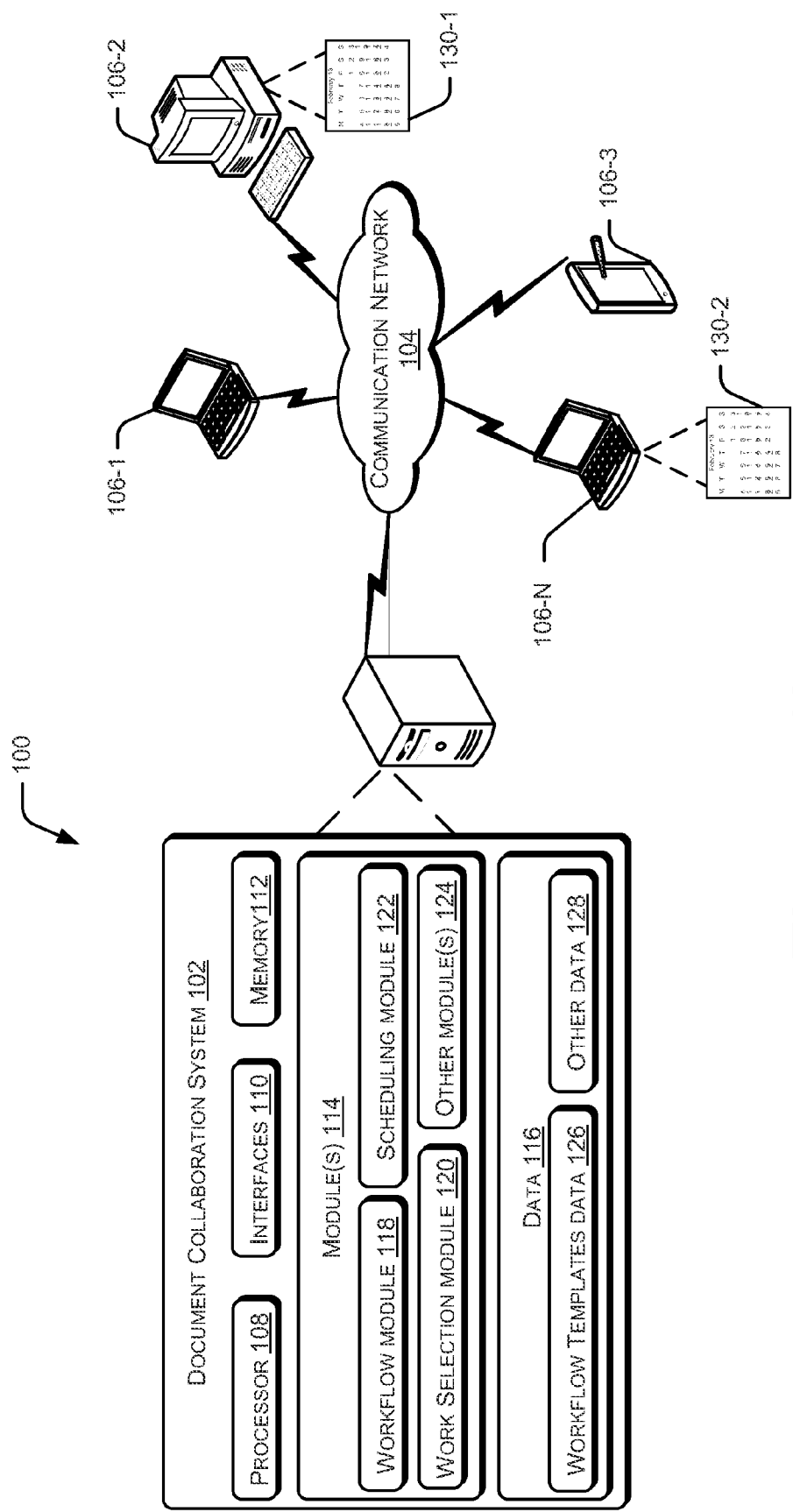
FIG. 1b schematically illustrates a collaborative network environment implementing a document collaboration system, according to an example of the present subject matter.

FIG. 1b illustrates a collaborative networking environment 100 implementing the document collaboration system 102, according to an implementation of the present subject matter. In one implementation, the document collaboration system 102 may be implemented as various commercially available computing systems, such as a server, a workstation, and a computer.

In one example, the document collaboration system 102 is communicatively coupled over a communication network 104 with a plurality of user devices 106-1, 106-2, 106-3, . . . , 106-N. The user devices 106-1, 106-2, 106-3, . . . , 106-N are collectively referred to as the user devices 106 and individually referred to as the user device 106 hereinafter. The user devices 106 may include, but are not restricted to, desktop computers, laptops, smart phones, personal digital assistants (PDAs), and tablets.

The communication network 104 can include different types of networks, such as intranet, local area network (LAN), wide area network (WAN) and the internet. The communication network 104 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other.

In an implementation, the document collaboration system 102 includes a processor 108 and a memory 112 coupled to the processor 108. The processor 108 may be implemented as microprocessors, microcomputers, microcontrollers, digital signal processors, central processing units, state machines, logic circuitries, and/or any devices that manipulate signals based on operational instructions. Among other capabilities, the processor 108 is configured to fetch and execute computer-readable instructions stored in the memory 112.

The memory 112, communicatively coupled to the processor 108, can include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The document collaboration system 102 also includes interfaces 110. The interfaces 110 may include a variety of commercially available interfaces, for example, interfaces for peripheral device(s), such as data input output devices, referred to as I/O devices, storage devices, network device. The interfaces 110 facilitate the communication of the document collaboration system 102 with various communication and computing devices and various communication networks, such as networks that use a variety of protocols, for example, Hypertext Transfer Protocol (HTTP) and Transmission Control Protocol/Internet Protocol (TCP/IP).

In one example, the document collaboration system 102 includes modules 114 and data 116. The modules 114 may be coupled to the processors 108. The modules 114, amongst other things, may include routines, programs, objects, components, data structures, and the like, which perform particular tasks or implement particular abstract data types. The data 116 serves, amongst other things, as a repository for storing data that may be fetched, processed, received, or generated by the modules 114. Although the data 116 is shown internal to the document collaboration system 102, it may be understood that the data 116 can reside in an external repository, which may be communicatively coupled to the document collaboration system 102.

In one example, the modules 114 of the document collaboration system 102 include a workflow module 118, a work selection module 120, a scheduling module 122, and other module(s) 124. The other module(s) 124 may include computer-readable instructions that supplement applications or functions performed by the document collaboration system 102. In an implementation, the data 116 of the document collaboration system 102 includes workflow templates data 126 and other data 128. The other data 128 may include data generated and saved by the modules 114 for providing various functionalities of the document collaboration system 102.

In an implementation, a project creator may use the workflow module 118 of the document collaboration system 102 to define a collaboration state in a workflow. The workflow may comprise different collaboration states or tasks associated with a new project. In one example, the collaboration state may comprise a predetermined schedule of users during which they are supposed to be working on the electronic document, for example, for editing a section of the electronic document or creating a new document. In one scenario, the project creator may create a new workflow for the project. In one example, the project creator may use the workflow module 118 to customize the workflow and assign each task of the project to a specific user. The workflow module 118 may also facilitate the project creator to assign each task to a group of users, who have to collaborate for the completion of the each task. In operation, the user may use the user devices 106 to access and logon to the document collaboration system 102 using his credentials, such as a username and a password, a personal identification number (PIN), and a smart card. On successful authentication, the user may use the work selection module 120 to view the tasks that have been assigned to the user.

The user may then generate an input for the work selection module 120 indicating his preference for executing a task. On receiving the input, the work selection module 120 may prompt the user to enter a schedule time slot during which he plans to perform the task by providing a start time and an end time for the task. For example, the user may indicate that he wants to start working on the second task, i.e., generating textual content for the electronic document at 10:00 hours on third January. The user may further indicate that he expects the task to be completed by 13:00 hours on third January. In one example, the user may choose to work on a plurality of electronic document at the schedule time. For example, the user may choose to edit and review the electronic documents at the same schedule time. In another example, the user may choose to work on trivial changes of the plurality of electronic documents in order to ensure efficient time management. In many scenarios, the user may indicate that he may complete the task in multiple sessions. For example, the user may work on the electronic document for two hours on third January, for four hours on fourth January and for six hours on seventh January to complete the task. The work selection module 120 may also facilitate the user to work on the electronic document in a recurring schedule. For example, the user may schedule to work on the electronic document every Wednesday from 9.00 Hrs to 12.00 Hrs.

The document collaboration system 102 may allocate the tasks based on the predetermined workflow. For example, the work selection module 120 may fetch data from the workflow templates data 126 to determine the start time and the end time. In another example, the document collaboration system 102 may allocate tasks based on the user's availability as reflected in a user planner, for example, user organizer, user electronic calendar, task scheduler, and the like.

Based on the start time and the end time determined by the work selection module 120, the scheduling module 122 may determine whether the electronic document has already been selected for editing or for completion of another task in the same or an overlapping schedule time slot. In case the scheduling module 122 determines that the electronic document has not been selected for editing during the same or an overlapping schedule time slot, the scheduling module 122 may retrieve the schedule of the user from various sources, such as the user's task scheduler, electronic mail client, task organizer, and electronic calendar. In one example, the scheduling module 122 may retrieve the schedule of the users from the electronic calendar, such as electronic calendars 130-1 and 130-2, individually may be referred as electronic calendar 130, configured in the user devices 106. The electronic calendar 130 may be any commercially available proprietary calendar, open source calendar, electronic calendar, online calendar or standalone calendar. The scheduling module 122 then analyzes the schedule of the user to determine whether the user is already scheduled to perform some other task or activity during the same or an overlapping schedule time slot.

If the scheduling module 122 determines that the user is available during the schedule time slot, the scheduling module 122 may assign the exclusive rights to access and edit the electronic document to the user for the schedule time slot. In one example, the scheduling module 122 may assign multiple users rights to access and edit the electronic document. For example, the multiple users may simultaneously be allowed to edit different section of the electronic document at a common or overlapping schedule time slot.

The document collaboration system 102 may provide different rights to different users, for example, to read and edit the electronic document at the common or overlapping schedule time slot. In one example, the scheduling module 122 may lock the electronic document so that the electronic document is inaccessible to other users during the schedule time slot. In one example, the scheduling may unlock the document when the electronic document is not scheduled to any of the user. The scheduling module 122 may assign read-only permission of the document to a plurality of users during the schedule time slot. For example, the scheduling module 122 may provide read permission to a plurality of users for review.

If the scheduling module 122 determines that the user is unavailable during the schedule time slot or is already scheduled to perform some other activity, the scheduling module 122 may generate a response to the user to alert the user of a potential conflict. In one example, the user may choose to ignore the response. In another example, the scheduling module 122 may force the user to select a different schedule time slot.

In case the scheduling module 122 determines that the electronic document has already been selected for editing during the same or an overlapping schedule time slot, the scheduling module 122 may generate a response for the user indicating that the electronic document is not available during the schedule time slot and prompt the user to select a different schedule time slot. In one example, the scheduling module 122 may respond by proposing schedule time slots which the user may select for working on the electronic document, based on at least one of the schedule of the user and the availability of the electronic document from the workflow. In case the user choose to select the proposed schedule time, the scheduling module 122 generates the response indicating the confirmation of the user to all the other users.

The scheduling module 122 may enforce a grace time period between the end time of a task and the start time of the subsequent task to allow for human error in estimating the time required for completion of a task. For example, the scheduling module 122 may enforce a minimum gap of an hour between the end time of a task and the start time of the subsequent task. In one example, the schedule module 122 may schedule the task without providing any grace time for the completion of task.

Table 1 provides an illustrative example of the working of the document collaboration system 102 by taking the example of three users, User A, User B and User C. In the table 1, the column named action depicts the action taken by the scheduling module 122.

TABLE 1

| Sl. No | Start Time-End Time (Time Slot) | User | Document Name | Action |
|---|---|---|---|---|
| 1 | 9.00 Hrs-10.00 Hrs | A | Document 1 | Exclusive Permission Granted for the document 1 |
| 2 | 9.00 Hrs-10.00 Hrs | B | Document 1 | Access Denied |
| 3 | 9.00 Hrs-10.00 Hrs | A | Document 3 | Response For User A alerting user of potential conflict. |

Thus, the document collaboration system 102 minimizes conflicts in access of the electronic documents in a collaborative network environment 100.

Figure 2A:
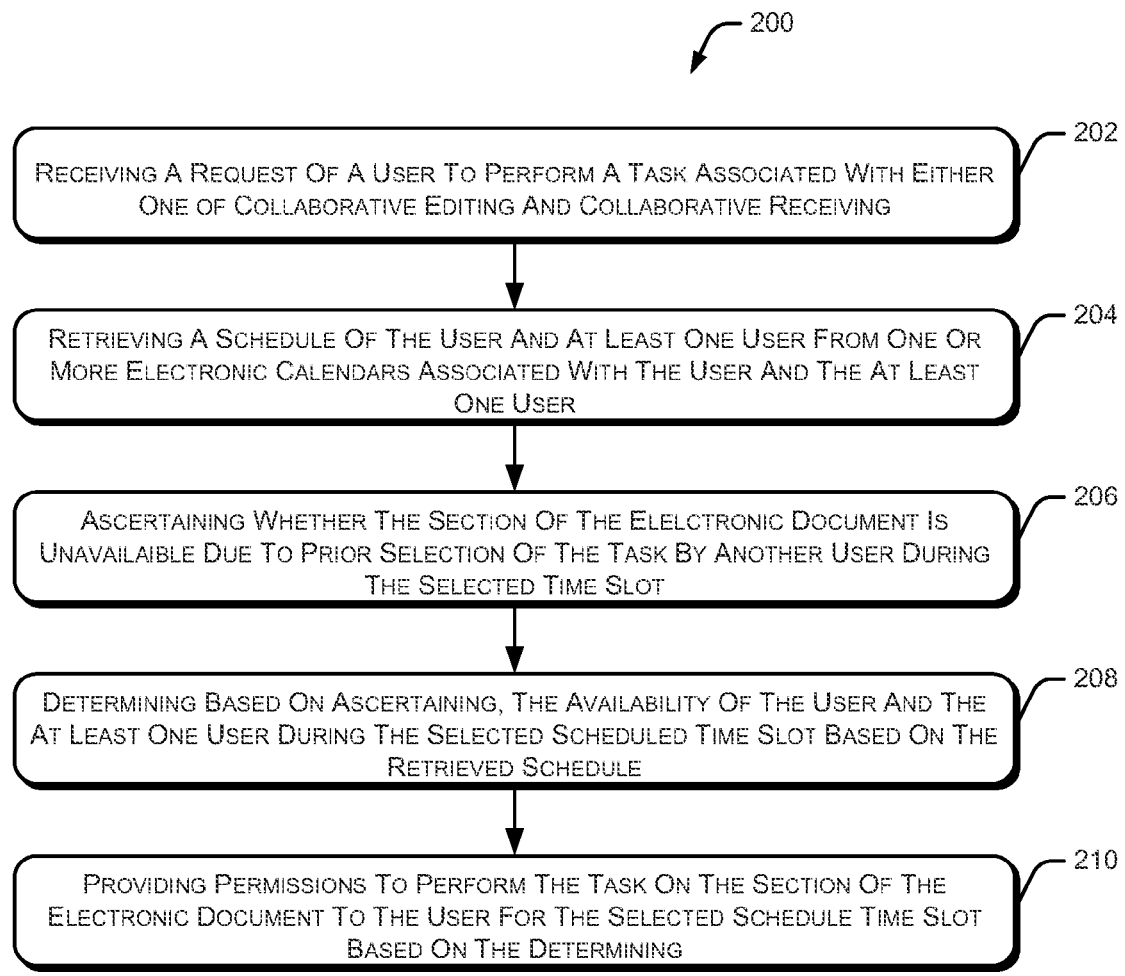
FIG. 2a illustrates a method for collaborative editing of an electronic document, according to an example of the present subject matter
Figure 2B:
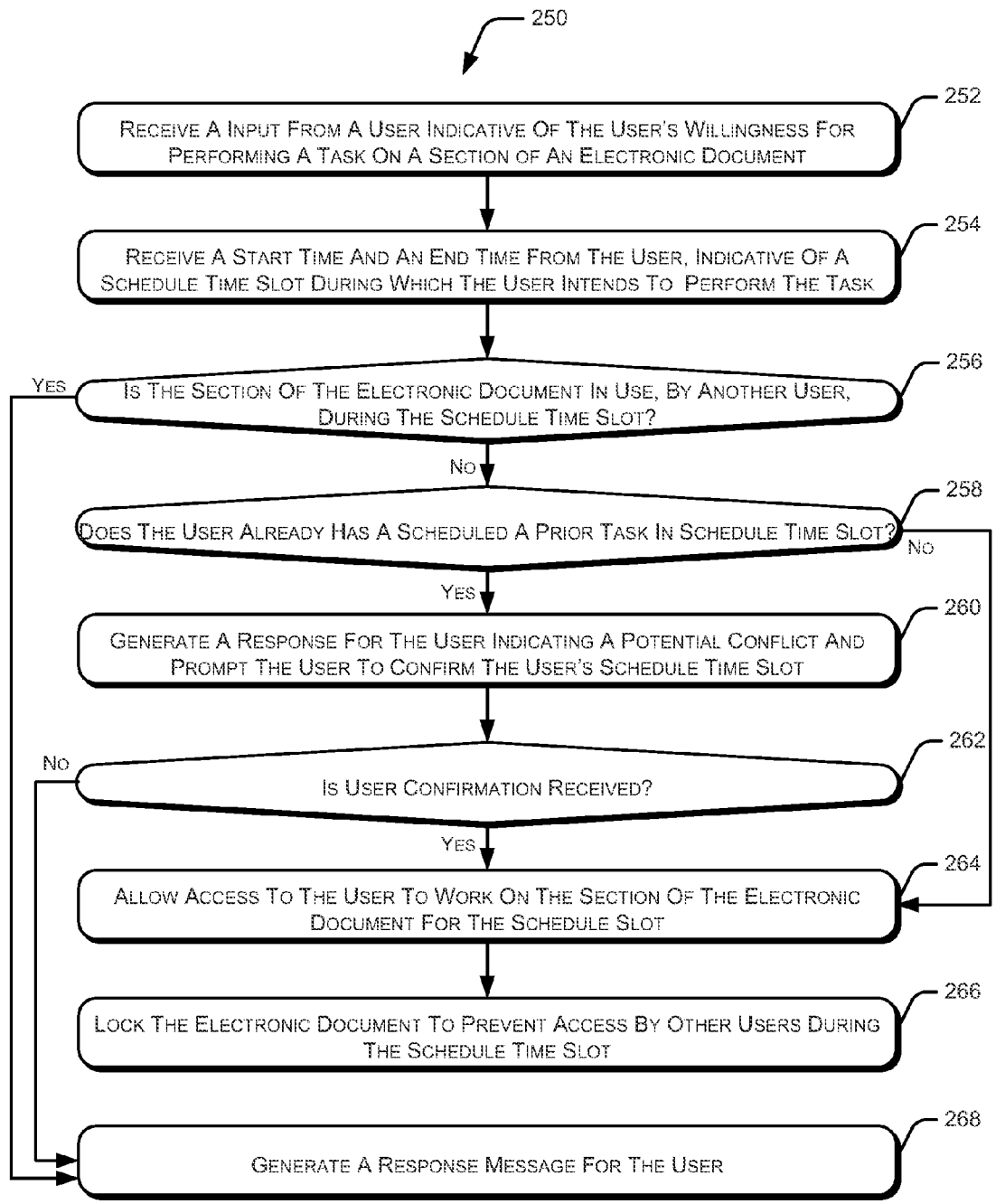
FIG. 2b illustrates a method for collaborative editing of an electronic document, according to another example of the present subject matter.

FIG. 2a and FIG. 2b illustrates methods 200 and 252 for collaborative editing of the electronic document, according to an implementation of the present subject matter. The order in which the methods 200 and 250 are described is not intended to be construed as a limitation, and some of the described method blocks can be combined in any order to implement the methods 200 and 250, or an alternative method. Additionally, individual blocks may be deleted from the methods 200 and 250 without departing from the scope of the subject matter described herein.

Furthermore, the methods 200 and 250 can be implemented by processor(s) or computing devices in any suitable hardware, computer readable instructions, or combination thereof. The methods 200 and 250 may be executed based on computer readable instructions stored on a non-transitory computer readable medium. The non-transitory computer readable medium may include, for example, digital data storage media, digital memories, magnetic storage media, such as a magnetic disks and magnetic tapes, hard drives, or optically readable digital data storage media.

With reference to method 200 as depicted in FIG. 2a, as depicted in block 202, a request of a user to perform a task, associated with either one of collaborative editing and collaborative reviewing, on a section of the electronic document, during a selected schedule time slot is received. The request received may be in collaboration with at least one user.

As shown in block 204, a schedule of the user and at least one user, from one or more electronic calendars associated with the user and the at least one user is retrieved. For example, the schedule of all of the users associated with the document collaboration system 102 may be retrieved from their respective electronic calendars.

As shown in block 206, it is ascertained whether the section of the electronic document is unavailable due to prior selection for the task by another user during the selected schedule time slot. For example, the document collaboration system 102 may ascertain the availability of one or more section of the electronic document based on the preferences provided by the users in the document collaboration system 102.

As shown in block 208, based on the ascertaining as illustrated in block 206, the availability of user and the at least one user is determined. The determination of the availability is based on the retrieved schedule as illustrated in block 204.

As illustrated in block 210, the user is provided permissions to perform the task based on the determining as illustrated in 208.

With reference to method 250 as depicted in FIG. 2b, as depicted in block 252, an input from a user indicative of the user's willingness to perform a task on a section of an electronic document is received. In one implementation, the user may use an interface generated by the work selection module 120 to select the task the user is interested to work on.

As shown in block 254 a start time and an end time, indicative of a schedule time slot during which the user intends to perform the task, is received from the user. In one example, the work selection module 120 prompts the user to enter the schedule time slot by specifying the start time and the end time.

As illustrated in block 256 it is determined whether the electronic document is in use, by another user, during the time slot selected by the user. In one implementation, the scheduling module 122 may determine whether another user has opted to work on the electronic document during the same or an overlapping schedule time slot.

If at block 256 it is determined that the electronic document is in use during the schedule time slot, then, as depicted in block 268, the scheduling module 122 may generate a response message for the user. The response message may inform the user about the conflict in accessing the electronic document. The scheduling module 122 may also prompt the user to enter a different schedule time slot for completion of the task.

If at block 256 it is determined that the electronic document is not in use during the schedule time slot then, as shown in block 258, the scheduling module 122 may determine whether the user has already scheduled some other activity during the same or an overlapping schedule time slot. In one example, the scheduling module 122 may retrieve the schedule of the user from various sources and analyze the same to ascertain the availability of the user.

If at block 258, it is determined that the user has already scheduled another activity in the same or overlapping schedule time slot then, as depicted in block 260, a response is generated for the user for alerting him of the potential conflict. In one implementation, the scheduling module 122 may generate the response and prompt the user to confirm the schedule time slot entered by him.

At block 262 it is determined whether the user has confirmed the schedule time slot entered by him. In case, the user confirmation has been received or if at block 258, it is determined that the user has not scheduled another activity in the same or overlapping schedule time slot, then as shown in block 264, the user is assigned permissions to work on the electronic document for the schedule time slot. As depicted in block 266, the scheduling module 122 may also lock the electronic document to prevent access or modification of the electronic document by other users during the schedule time slot.

If at block 262, it is determined that the user confirmation has not been received then, as shown in block 268 the scheduling module 122 may generate a response message for the user indicating that the user has aborted the operation. The response message may also request the user to enter a different time slot for completion of the task. In one example, the document collaboration system 102 may unlock the electronic document when the user aborts the operation or user confirmation is not received for scheduling of the task within predetermined time slot.

Thus, the methods 200 and 250 for collaborative editing of electronic documents minimize conflicts in access of the electronic documents by locking the electronic document from being accessed by other users whenever a user is scheduled to work on it.

Figure 3:
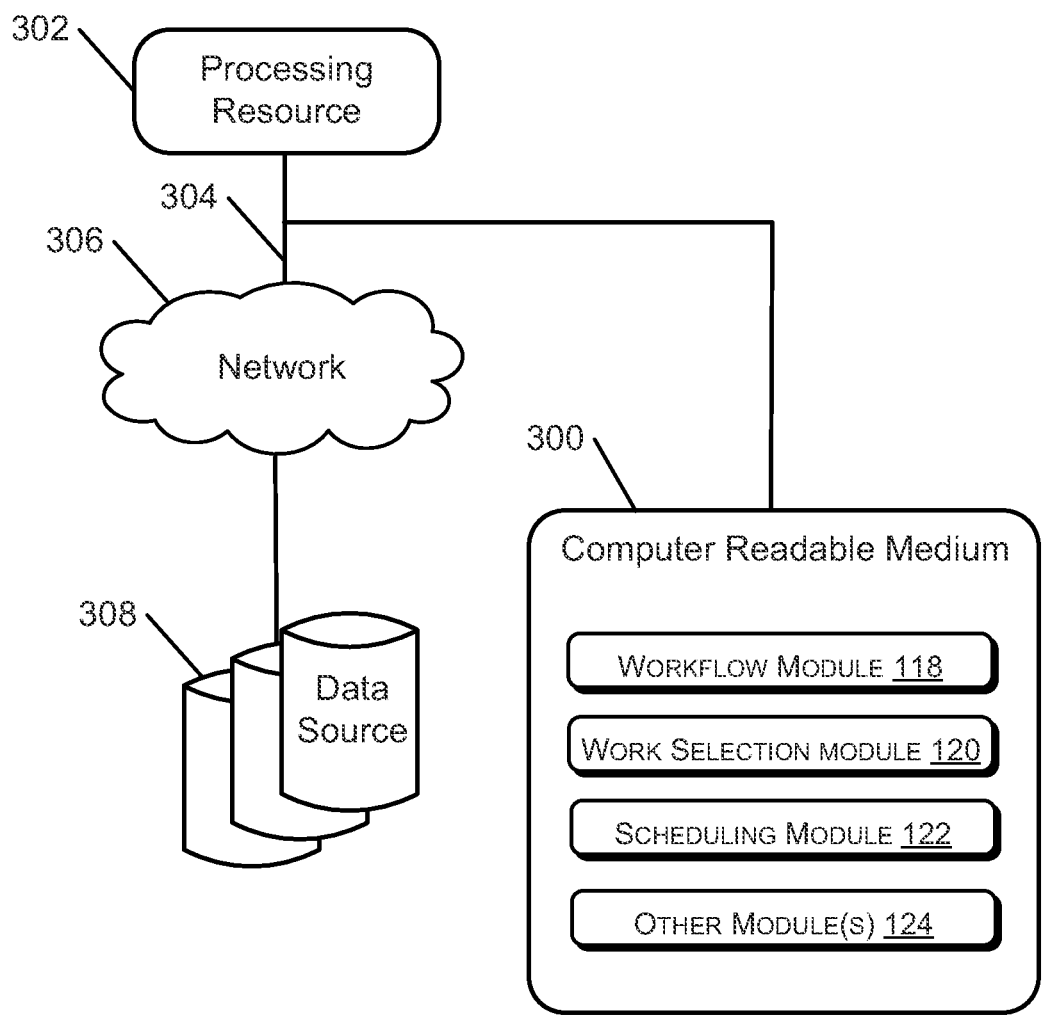
FIG. 3 illustrates a computer readable medium storing instructions for collaborative editing of an electronic document, according to an example of the present subject matter.

FIG. 3 illustrates a computer readable medium 300 storing instructions for printing a document, according to an example of the present subject matter. In one example, the computer readable medium 300 is communicatively coupled to a processing resource 302 over a communication link 304.

For example, the processing resource 302 can be a computing device, such as a server, a laptop, a desktop, a mobile device, and the like. The computer readable medium 300 can be, for example, an internal memory device or an external memory device or any commercially available non transitory computer readable medium. In one implementation, the communication link 304 may be a direct communication link, such as any memory read/write interface. In another implementation, the communication link 304 may be an indirect communication link, such as a network interface. In such a case, the processing resource 302 can access the computer readable medium 300 through a network 306. The network 306, like the communication network 104, may be a single network or a combination of multiple networks and may use a variety of different communication protocols.

The processing resource 302 and the computer readable medium 300 may also be communicatively coupled to data sources 308 over the network. The data sources 308 can include, for example, databases and computing devices. The data sources 308 may be used by the requesters and the agents to communicate with the processing unit 302.

In one implementation, the computer readable medium 300 includes a set of computer readable instructions, such as workflow module 118, work selection module 120, scheduling module 122, and other modules 124. The set of computer readable instructions can be accessed by the processing resource 302 through the communication link 304 and subsequently executed to perform acts for collaborative editing of electronic documents.

On execution by the processing resource 302, the workflow module 118 is used to define a collaboration state in a work flow. The collaboration state may comprise predetermined schedule of collaborative editing of the electronic document by a user. In one example, the workflow module 118 may also be used to assign different tasks associated with the collaborative editing of electronic document to the user by a project creator.

Further, the work selection module 120 may receive input from the user indicating their preference for executing the task assigned to her. For example, the user may provide start and end time of preferred time slot for the execution of the task.

Based on the start time and the end time determined by the work selection module 120, the scheduling module 122 may determine the availability of the electronic document and the user for the user provided time slot. For example, the scheduling module 122 may determine the availability of user based on electronic calendars, task schedulers, task organizers, electronic mail client, and the like. Based on the determination of availability of users and the electronic document, the scheduling module 122 may schedule editing of the document among different users. In one example, the scheduling module 122 may provide different editing rights to different users while scheduling the task among the users. In one example, the users may be scheduled for the task for which read-only rights are provided to the electronic document while other users may be scheduled for "write" right to edit the electronic document at the same or overlapping time slot.

Although implementations for collaborative editing of electronic documents have been described in language specific to structural features and/or methods, it is to be understood that the appended claims are not necessarily limited to the specific features or methods described. Rather, the specific features and methods are disclosed as examples of systems and methods for collaborative editing of electronic documents.

We claim:

1. A document collaboration system comprising:
   a processor;
   scheduling instructions executable on the processor to:
      receive a request from a user for collaborative editing or collaborative reviewing of a section of an electronic document during a schedule time slot selected by the user;
      retrieve a schedule of the user;
      ascertain whether the section of the electronic document is unavailable for the collaborative editing or the collaborative reviewing during the selected schedule time slot;
      in response to ascertaining that the section of the electronic document is unavailable for the collaborative editing or the collaborative reviewing during the selected schedule time slot, propose a different schedule time slot for the user to perform the collaborative editing or the collaborative reviewing of the section of the electronic document; and
      in response to ascertaining that the section of the electronic document is available for the collaborative editing or the collaborative reviewing during the selected schedule time slot, determine availability of the user during the selected schedule time slot based on the retrieved schedule and in response to the determining, allow access to the user for the collaborative editing or the collaborative reviewing of the section of the electronic document for the selected schedule time slot.

2. The document collaboration system as claimed in claim 1, wherein the scheduling instructions are executable on the processor to lock the section of the electronic document from being edited by another user during the selected schedule time slot.

3. The document collaboration system as claimed in claim 1, wherein the scheduling instructions are executable on the processor to generate another proposed time slot for the collaborative editing or the collaborative reviewing of the section of the electronic document based on determining unavailability of the user.

4. The document collaboration system as claimed in claim 1, wherein the scheduling instructions are executable on the processor to:
   receive a collaboration request of the user for the collaborative editing or the collaborative reviewing of the section of the electronic document in collaboration with at least one user during the selected schedule time slot;
   retrieve a collaboration schedule of the at least one user from an electronic calendar of the at least one user;
   determine availability of the at least one user during the selected schedule time slot based on the retrieved collaboration schedule; and
   provide permissions, for the collaborative editing or the collaborative reviewing of the section of the electronic document, to the user for the selected schedule time slot based on the availability of the at least one user.

5. The document collaboration system as claimed in claim 1 further comprising workflow instructions executable on the processor to receive a workflow comprising a collaboration state associated with the user, wherein the collaboration state comprises a task associated with the collaborative editing or the collaborative reviewing.

6. The document collaboration system as claimed in claim 1 further comprising work selection instructions executable on the processor to:
   receive a user input indicative of the user's preference to perform a task associated with the collaborative editing or the collaborative reviewing;
   generate an interface to prompt the user to select a schedule time slot for performing the task;
   ascertain whether the selected schedule time slot for performing the task complies with a chronological order in which the task has to be performed; and
   generate a response for the user to select a new schedule time slot in response to ascertaining that the selected schedule time slot for performing the task does not comply with the chronological order.

7. The document collaboration system as claimed in claim 1, wherein the selected schedule time slot is a recurring time interval.

8. A method comprising:
   receiving, by a system comprising a processor, a request of a first user to perform a task associated with collaborative editing or collaborative reviewing, in collaboration with a second user, of a section of an electronic document during a selected schedule time slot selected by the first user;
   retrieving, by the system, schedules of the first and second users from electronic calendars associated with the first and second users;
   ascertaining, by the system, whether the section of the electronic document is unavailable due to prior selection for collaborative editing or collaborative reviewing by another user during the selected schedule time slot;
   in response to ascertaining that the section of the electronic document is unavailable, proposing, by the system, a different schedule time slot for the collaborative editing or the collaborative reviewing of the section of the electronic document by the first user in collaboration with the second user;
   determining, by the system in response to ascertaining that the section of the electronic document is available, availability of the first and second users during the selected schedule time slot based on the retrieved schedules, and, in response to the determining, providing permissions, to perform the task on the section of the electronic document, to the first user for the selected schedule time slot.

9. The method as claimed in claim 8, further comprising:
   locking the section of the electronic document from being edited by other users during the selected schedule time slot; or
   providing the other users with read-only access of the section of the electronic document.

10. The method as claimed in claim 8, further comprising generating a proposed schedule time slot for the task in response to the first and second users being unavailable during the selected schedule time slot.

11. The method as claimed in claim 8, further comprising:
ascertaining whether the selected schedule time slot for performing the task complies with a chronological order in which the task has to be performed; and
generating a response for the first user to select a new schedule time slot in response to ascertaining the selected schedule time slot does not to comply with the chronological order.

12. A non-transitory computer-readable medium storing computer readable instructions that, when executed, cause a document collaboration system to:
receive a request input by a first user to perform a task associated with collaborative editing or collaborative reviewing, in collaboration with a second user, of a section of an electronic document during a selected schedule time slot;
retrieve schedules of the first and second users;
ascertain whether the section of the electronic document is unavailable due to prior selection for collaborative editing or collaborative reviewing by another user during the selected schedule time slot;
in response to ascertaining that the section of the electronic document is unavailable, propose a different schedule time slot for the collaborative editing or the collaborative reviewing of the section of the electronic document by the first user in collaboration with the second user;
in response to ascertaining that the section of the electronic document is available, determine availability of the first and second users during the selected schedule time slot based on the retrieved schedules; and
in response to ascertaining that the section of the electronic document is available and determining that the first and second users are available, provide permissions to perform the task on the section of electronic document, to the first user for the selected schedule time slot.

13. The non-transitory computer-readable medium as claimed in claim 12, wherein the instructions when executed cause the document collaboration system to:
lock the section of the electronic document during the selected schedule time slot; or
provide other users with read-only access of the section of the electronic document.

14. The non-transitory computer-readable medium as claimed in claim 12, wherein the instructions when executed cause the document collaboration system to generate a proposed schedule time slot for cite the task in response to determining the unavailability of the first and second users during the selected schedule time slot.

15. The document collaboration system as claimed in claim 1, wherein the ascertaining that the section of the electronic document is unavailable is responsive to determining that the section of the document is in use by another user.

16. The document collaboration system as claimed in claim 15, wherein the determining that the section of the document is in use by the another user is based on a schedule of the another user.

17. The document collaboration system as claimed in claim 1, wherein the user is determined to be unavailable responsive to a schedule of the user indicating that the user has already scheduled another task during the selected schedule time slot.

18. The method as claimed in claim 8, wherein the ascertaining that the section of the document is unavailable due to prior selection by the another user is based on a schedule of the another user.

19. The non-transitory computer-readable medium as claimed in claim 12, wherein the ascertaining that the section of the document is unavailable due to prior selection by the another user is based on a schedule of the another user.

* * * * *

UNITED STATES PATENT AND TRADEMARK OFFICE
CERTIFICATE OF CORRECTION

PATENT NO. : 9,514,110 B2  
APPLICATION NO. : 13/853024  
DATED : December 6, 2016  
INVENTOR(S) : Anjaneyulu Seetha Rama Kuchibhotla et al.

Page 1 of 1

It is certified that error appears in the above-identified patent and that said Letters Patent is hereby corrected as shown below:

In the Claims

In Column 11, Line 40, in Claim 1, delete "schedule" and insert -- schedule, --, therefor.

In Column 14, Line 11, in Claim 14, delete "for cite" and insert -- for --, therefor.

Signed and Sealed this  
Eighteenth Day of April, 2017

Michelle K. Lee  
*Director of the United States Patent and Trademark Office*